United States Patent
Smith et al.

(10) Patent No.: US 9,365,100 B2
(45) Date of Patent: Jun. 14, 2016

(54) REDUCED POWERTRAIN VIBRATION MOUNTING SYSTEM

(71) Applicant: GM GLOBAL TECHNOLOGY OPERATIONS LLC, DETROIT, MI (US)

(72) Inventors: Todd H. Smith, Almont, MI (US); John K. Hicks, Bruce Township, MI (US); Michael A. Bride, Farmington Hills, MI (US); Kathy L. Amerman, Milford, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 14/538,841

(22) Filed: Nov. 12, 2014

(65) Prior Publication Data
US 2016/0129775 A1    May 12, 2016

(51) Int. Cl.
*B60K 5/12* (2006.01)
*B60K 5/02* (2006.01)
*B62D 1/20* (2006.01)
*B60K 17/16* (2006.01)

(52) U.S. Cl.
CPC ... *B60K 5/12* (2013.01); *B60K 5/02* (2013.01); *B60K 17/165* (2013.01); *B62D 1/20* (2013.01)

(58) Field of Classification Search
CPC ............ B60K 5/12; B60K 6/365; B60K 5/02
USPC .......................... 180/65.265, 65.28, 299, 291
See application file for complete search history.

(56) References Cited

U.S. PATENT DOCUMENTS

| | | | | |
|---|---|---|---|---|
| 5,152,255 | A * | 10/1992 | Fukuda | F01B 1/12 180/190 |
| 6,312,300 | B1 * | 11/2001 | Asai | F02B 61/045 440/88 C |
| 6,712,519 | B2 * | 3/2004 | Zauner | F16C 9/02 384/486 |
| 7,644,687 | B2 * | 1/2010 | Zauner | F01P 3/12 123/41.79 |
| 2007/0029713 | A1 * | 2/2007 | Shin | G05D 19/02 267/140.15 |
| 2007/0095305 | A1 * | 5/2007 | Matsuda | F01P 3/16 123/41.31 |
| 2010/0038158 | A1 * | 2/2010 | Whitney | B60K 6/365 180/65.265 |
| 2011/0070999 | A1 * | 3/2011 | Soliman | B60W 10/026 477/3 |
| 2013/0080007 | A1 * | 3/2013 | Monfette | B60W 10/107 701/61 |
| 2015/0175149 | A1 * | 6/2015 | Zhao | B60W 20/00 701/22 |

* cited by examiner

*Primary Examiner* — Hau Phan
(74) *Attorney, Agent, or Firm* — Quinn Law Group, PLLC (57) ABSTRACT

A vehicle includes a cradle having a structure substantially aligned along a horizontal plane, and a tower extending vertically upward from the structure. A powertrain is supported by the cradle, and includes an elastic axis, and a torque axis. An engine mounting system interconnects the powertrain and the cradle. The engine mounting system includes an engine mount that is attached to the tower, and a mounting bracket attached to the powertrain and the engine mount. An elastic center of the tower is laterally offset from the torque axis, and is vertically offset from the torque axis to position the engine mounting system, such that the elastic axis of the powertrain is substantially aligned with the torque axis of the powertrain.

19 Claims, 7 Drawing Sheets

REDUCED POWERTRAIN VIBRATION MOUNTING SYSTEM

TECHNICAL FIELD

The disclosure generally relates to an engine mounting system for a vehicle having a longitudinally mounted, rear wheel drive engine/powertrain, wherein the engine mounting system is positioned to reduce vibration of the powertrain.

BACKGROUND vehicles include a powertrain that may be mounted longitudinally along a longitudinal axis of the vehicle. The powertrain includes, but is not limited to, an engine and a transmission. In order to improve fuel efficiency, some vehicles may incorporate a 12V start/stop system. A 12V start/stop system automatically stops the engine when the vehicle is stopped, such as when the vehicle is stopped at a stop sign, and restarts the engine when an operator depresses the gas pedal to accelerate away from the stop sign. The engine is started using a starter powered by the vehicle's electrical system. The stopping and starting of the engine using a start/stop system may introduce vibration into the vehicle.

SUMMARY

A includes a frame that extends along a longitudinal axis between a forward end and a rearward end. A cradle is attached to the frame proximal to the forward end of the frame. A powertrain is supported by the cradle. The powertrain includes a crank that defines a crank axis, which extends along the longitudinal axis of the frame, in a rear wheel drive configuration. The powertrain defines an elastic axis, which is defined as an axis extending through the powertrain along which the powertrain only rotates without any translation (lateral displacement) due to a unit torque applied on that axis, dependent on the mount locations, orientation, and stiffness. The powertrain further defines a torque axis, which is defined as an axis about which the powertrain oscillates about in response to an oscillating crankshaft torque in an unconstrained powertrain. An engine mounting system interconnects the powertrain and the cradle. The engine mounting system supports the powertrain relative to the frame such that the elastic axis of the powertrain is substantially aligned with the torque axis of the powertrain. In some examples, this may serve to reduce vibration during engine start/stop.

A vehicle configured for rear wheel drive is also provided. The vehicle includes a frame extending along a longitudinal axis, between a forward end and a rearward end. A cradle is attached to the frame adjacent the forward end of the frame. The cradle includes a structure substantially aligned along a horizontal plane, and a tower extending vertically upward from the structure. A powertrain is supported by the cradle. The powertrain includes a crank axis that extends along the longitudinal axis of the frame. The powertrain defines an elastic axis and a torque axis. An engine mounting system interconnects the powertrain and the cradle. The engine mounting system includes an engine mount that is attached to the tower, and a mounting bracket attached to the powertrain and the engine mount. The tower is laterally offset from the longitudinal axis, and elevates the engine mount to position the engine mounting system such that an angle between the elastic axis and a horizontal plane is within 5° of an angle between the torque axis and the horizontal plane. The engine mounting system further positions the powertrain such that a center of gravity of the powertrain is vertically offset from the elastic axis a distance equal to or less than 50 mm.

Accordingly, the positioning of the engine mounting system substantially aligns the elastic axis with the torque axis. Aligning the elastic axis with the torque axis reduces the vibration in the powertrain that is caused by starting and stopping the engine, thereby reducing vibration experienced by the occupant when using automatic start/stop procedures. The tower of the cradle moves the engine mounts vertically upward relative to the powertrain, and laterally outboard relative to the longitudinal axis of the body, when compared to convention engine mounts, to position the engine mounts as close to the powertrain roll center as possible for roll mode decoupling.

The above features and advantages and other features and advantages of the present teachings are readily apparent from the following detailed description of the best modes for carrying out the teachings when taken in connection with the accompanying drawings.

DETAILED DESCRIPTION

Those having ordinary skill in the art will recognize that terms such as "above," "below," "upward," "downward," "top," "bottom," etc., are used descriptively for the figures, and do not represent limitations on the scope of the disclosure, as defined by the appended claims. Furthermore, the teachings may be described herein in terms of functional and/or logical block components and/or various processing steps. It should be realized that such block components may be comprised of any number of hardware, software, and/or firmware components configured to perform the specified functions.

Figure 1:
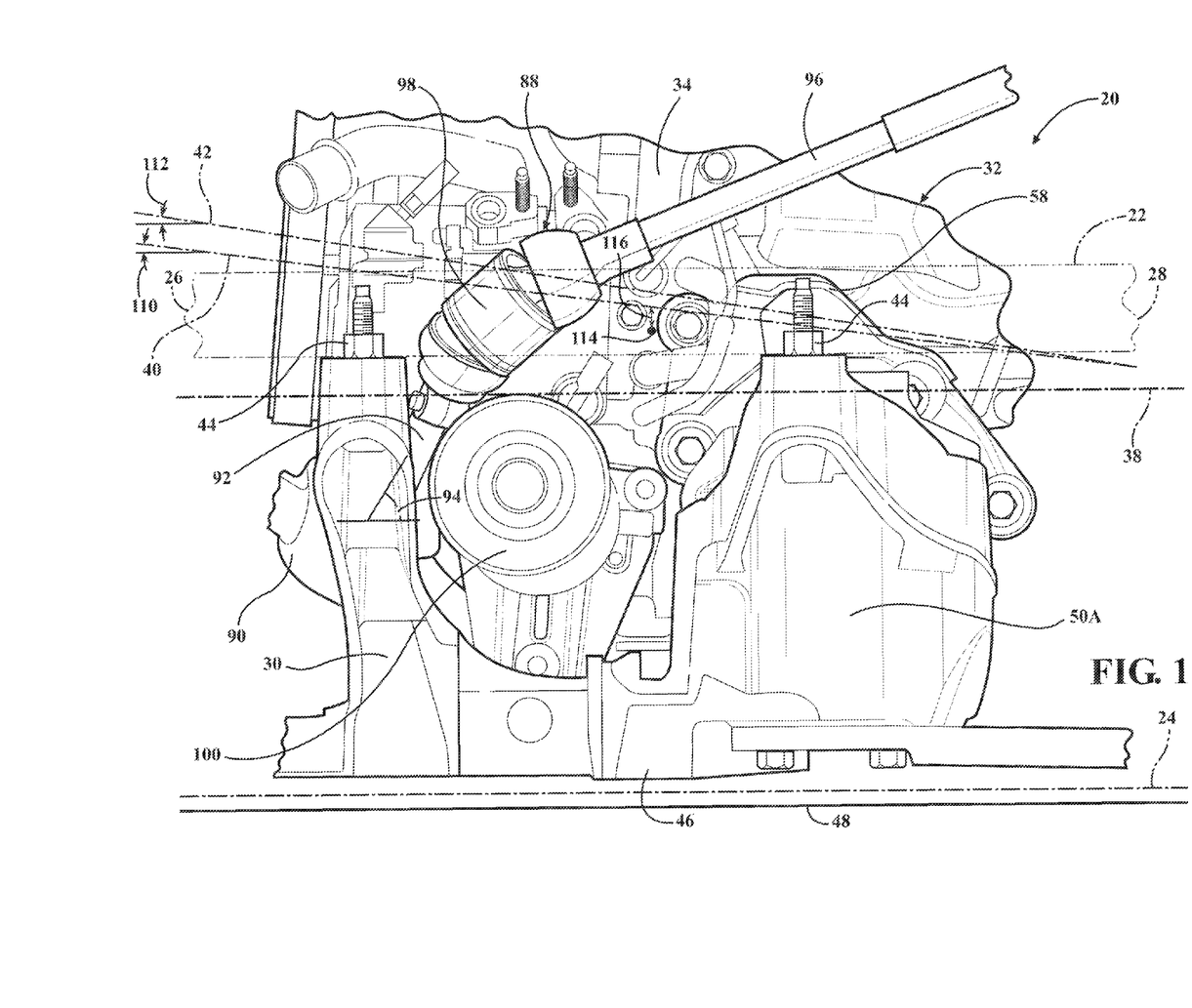
FIG. 1 is a schematic plan view of a vehicle, shown from a left side of the vehicle.

Referring to the Figures, wherein like numerals indicate like parts throughout the several views, a rear wheel drive vehicle is generally shown at 20. Referring to FIG. 1, the vehicle 20 includes a frame 22 that extends along a longitudinal axis 24. The frame 22 extends between a forward end 26 and a rearward end 28. The frame 22 supports a cradle 30, which is attached to the frame 22 adjacent the forward end 26 of the frame 22. A powertrain 32 is attached to and supported by the cradle 30. The powertrain 32 includes, but is not limited to, an engine 34 and a transmission (not shown) attached to the engine 34. The engine 34 may include an internal combustion engine, such as a gasoline or diesel engine. The transmission transmits a drive torque from the engine 34 to a drive line (not shown) as is known in the art.

The powertrain 32, and more specifically, the engine 34, includes a crankshaft (not shown) that defines a crank axis 38. The crank axis 38 extends along the longitudinal axis 24, in a rear wheel drive configuration. Accordingly, it should be appreciated that the engine 34 is arranged in what may be referred to as a north/south configuration, in which the crankshaft extends along the longitudinal axis 24. The powertrain 32 defines an elastic axis 40 and a torque axis 42. As used herein, the elastic axis 40 is defined as an axis extending through the powertrain 32, along which the powertrain 32 only oscillates without any translation (lateral displacement or movement) due to a unit torque applied to the elastic axis 40. The elastic axis 40 may alternatively be described as a dynamic axis of rotation around which the powertrain 32 rotates without any lateral translation in response to a torque applied to the elastic axis 40. It should be appreciated that the elastic axis 40 is a function of the powertrain 32 as a whole, and is not defined by any single feature of the powertrain 32. As such, the exact location of the elastic axis 40 will vary depending upon the specific configuration of the powertrain 32, and is determined or identified through testing. Accordingly, a unit torque applied to the powertrain 32 at the elastic axis 40 will produce only oscillation or rotation of the powertrain 32 about the elastic axis, with no appreciable lateral translation or movement, e.g., vibration. The torque axis 42 is defined as an axis about which the powertrain 32 oscillates around in response to an oscillating crankshaft torque in an unconstrained powertrain. The torque axis 42 may alternatively be described as a geometric axis of rotation around which the powertrain 32 rotates in response to the oscillating crankshaft torque. It should be appreciated that the torque axis 42 is a function of the powertrain 32 as a whole, and is not defined by any single feature or component of the powertrain 32. As such, the exact location of the torque axis 42 will vary depending upon the specific configuration of the powertrain 32, and is determined or identified through testing.

Figure 3:
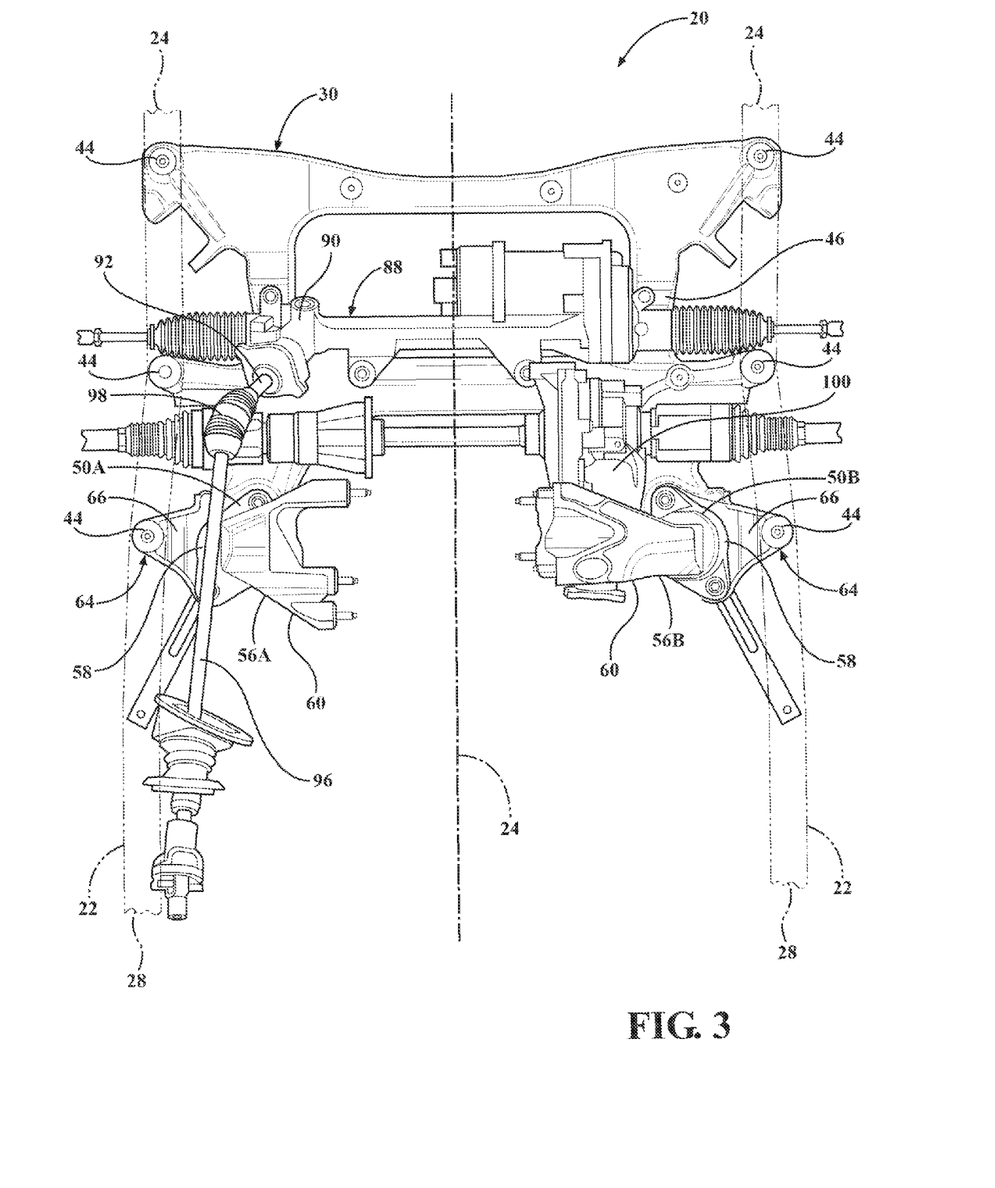
FIG. 3 is a schematic plan view of the vehicle, as viewed from above.

Referring to FIG. 3, the cradle 30 is attached to the frame 22 of the vehicle 20, at several different locations. The cradle 30 may be attached to the frame 22 in any suitable manner. For example, the cradle 30 may be bolted to the frame 22 with a plurality of bolts 44. The cradle 30 is used to support and attach several different components to the frame 22.

Figure 2:
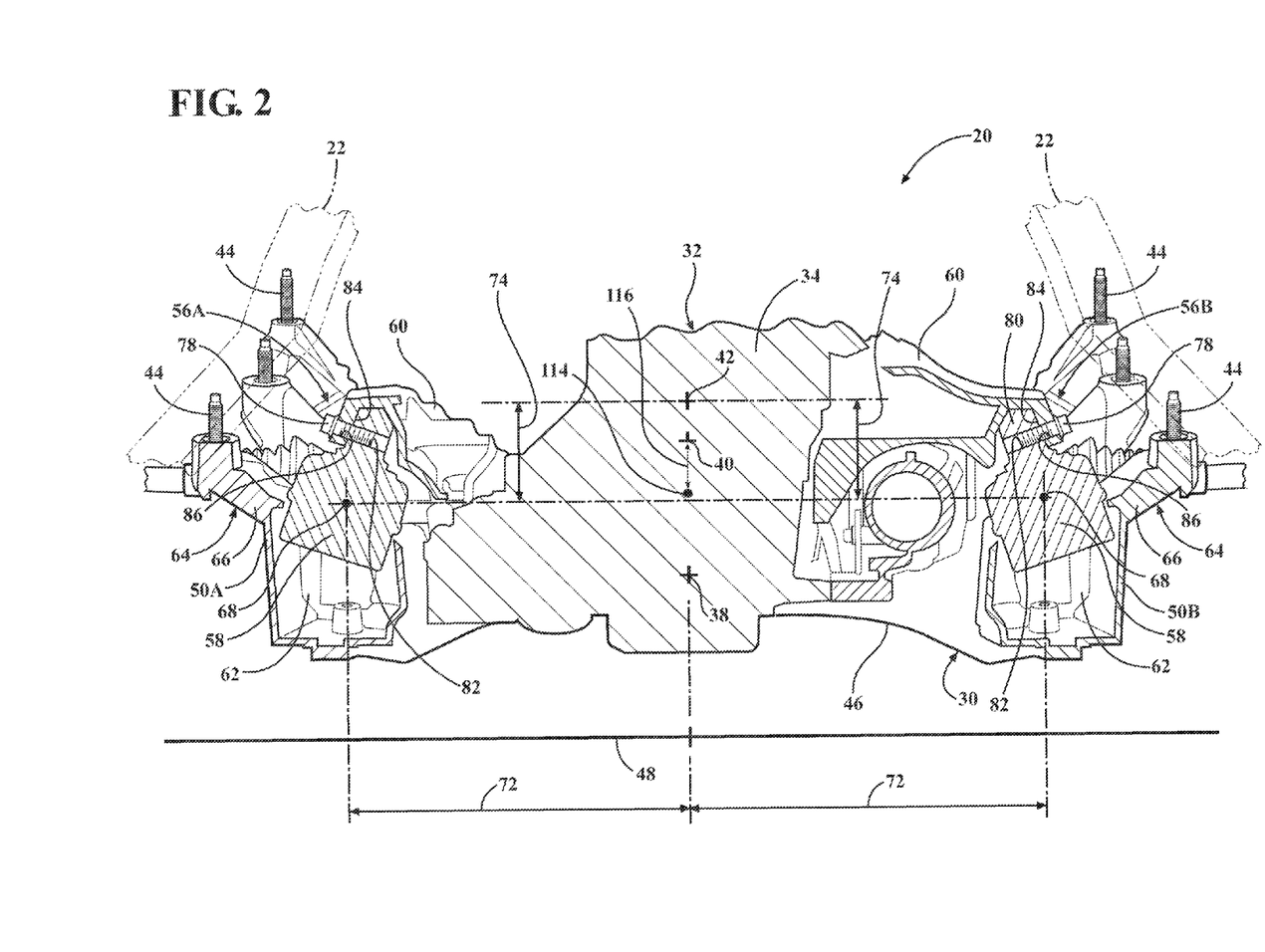
FIG. 2 is a schematic cross sectional view of the vehicle, as viewed from the rear of the vehicle.

Referring to FIG. 1, the cradle 30 includes a lower cradle structure 46, which is substantially aligned along or disposed parallel with a horizontal plane 48. Referring also to FIG. 2, the lower cradle structure 46 includes an integral tower 50. As shown in the Figures, the cradle 30 includes a pair of towers 50, with a first tower 50A disposed on a driver's side, i.e., a left side of the longitudinal axis 24, and a second tower 50B disposed on a passenger side, i.e., a right lateral side of the longitudinal axis 24. The first tower 50A and the second tower 50B are referred to generally with reference numeral 50, and are shown in the Figures and referred to specifically by reference numerals 50A, and 50B, respectively. While the detailed description generally describes a singular tower 50, it should be appreciated that the written description is applicable to both the first tower 50A and the second tower 50B, whether specifically mentioned or not.

As best shown in FIG. 2, the tower 50 extends vertically upward from the lower cradle structure 46. The top of the tower 50 is vertically spaced above the lower cradle structure 46. The distance that the top of the tower 50 is spaced above the lower cradle structure 46 is dependent upon the specific design configuration of the vehicle 20, size and/or height of the engine 34.

With continued reference to FIG. 2, the tower 50 supports an engine mounting system 56. The engine mounting system 56 interconnects the powertrain 32 and the cradle 30. The engine mounting system 56 includes a first engine mounting system 56A disposed on the driver's side, i.e., the left side of the longitudinal axis 24, and a second engine mounting system 56B disposed on the passenger's side, i.e., the right side of the longitudinal axis 24. The first engine mounting system 56A and the second engine mounting system 56B are referred to generally with reference numeral 56, and are shown in the Figures and referred to specifically by reference numerals 56A, and 56B, respectively. While the detailed description generally describes a singular engine mounting system 56, it should be appreciated that the written description is applicable to both the first engine mounting system 56A and the second engine mounting system 56B, whether specifically mentioned or not.

The engine mounting system 56 supports the powertrain 32 relative to the frame 22. The engine mounting system 56 is attached to the powertrain 32 to position the powertrain 32 such that the elastic axis 40 is substantially aligned with the torque axis 42. Accordingly, referring to the example of FIG. 1, the engine mounting system 56 supports the powertrain 32 relative to the frame 22 such that the elastic axis 40 of the powertrain 32 is substantially aligned with the torque axis 42 of the powertrain 32. As shown, aligning the elastic axis 40 with the torque axis 42 reduces vibration of the powertrain 32 that occurs, for example, when starting and stopping the engine 34. These vibrations may be more noticeable in vehicles that have a start/stop system, in which the vehicle automatically stops and starts the engine. Some embodiments of a start/stop system include, but are not limited to, a controller electrically connected to a fuel injections system and starting system of the engine 34. In one non-limiting example, when an ignition switch of the vehicle is on, the controller may be configured to shut off the engine 34 when the vehicle is stopped by shutting off the fuel injection system, and to start the engine when an operator of the vehicle depresses an accelerator pedal of the vehicle 20. In some examples, the starting system may include an engine starter configured to engage a flywheel of the engine 34 and receiving power from the 12 volt electrical system of the vehicle 20. In other examples, the starting system may include a variety of other devices configured to start the engine, such as a belt alternator starter configured to engage an accessory belt of the engine 34 and receiving power from a variety of sources at various voltages. In still other embodiments, it is possible some starting systems may include a hydraulically or pneumatically actuated starter. The controller may include a control module, such as but not limited to an engine control unit, to control the operation of the engine 34. The controller may include a computer and/or processor, and include all software, hardware, memory, algorithms, connections, sensors, etc., necessary to manage and control the operation of the engine 34 It should be appreciated that the controller may include any device capable of analyzing data from various sensors, comparing data, making the necessary decisions required to control the operation of the engine, including the start/stop system, and executing the required tasks necessary to control the operation of the engine 34.

The elastic axis 40 and the torque axis 42 may be considered substantially aligned when an elastic angle 110 is within 5° of a torque angle 112, and a powertrain center of gravity 114 is offset a distance 116, from the elastic axis 40, that is no more than 50 mm. As used herein, the elastic angle 110 is defined as the angle between the elastic axis 40 and the horizontal plane 48. As used herein, the torque angle 112 is defined as the angle between the torque axis and the horizontal plane 48. Accordingly, the elastic axis and the torque axis may be considered substantially aligned when an absolute value of a difference between the elastic angle 110 and the torque angle 112 is less than 5°, and the powertrain center of gravity 114 is vertically offset a distance of less than 50 mm from the elastic axis 40.

Referring to FIG. 2, the engine mounting system 56 is attached to and supported by the tower 50. The engine mounting system 56 includes an engine mount 58 and a mounting bracket 60. The engine mount 58 is attached to the tower 50. The mounting bracket 60 is attached to the powertrain 32, and more specifically, to the engine 34 of the powertrain 32. The mounting bracket 60 and the engine mount 58 are connected and/or attached to each other to interconnect the cradle 30 and the powertrain 32.

As noted above, the tower 50 extends vertically upward from the lower cradle structure 46 of the cradle 30. The tower 50 may include a generally hollow, tubular structure, which defines a central cavity 62. The engine mount 58 may be at least partially disposed within the central cavity 62 of the tower 50. Accordingly, a portion of the engine mount 58 may be disposed within the central cavity 62 of the tower 50, below the upper surface of the tower 50, while the remainder of the engine mount 58 is disposed above the top or upper surface of the tower 50.

As shown in FIG. 2, the tower 50 includes an attachment structure 64, which interconnects the cradle 30 and the frame 22. More specifically, the attachment structure 64 attaches the tower 50, at or near the upper surface of the tower 50, to the frame 22. As such, the attachment structure 64 is disposed adjacent the upper surface of the tower 50, near the engine mount 58, to support the tower 50 relative to the lower cradle structure 46 of the cradle 30. The attachment structure 64 attaches the tower 50 to the frame 22 to increase the rigidity and strength of the tower 50. The attachment structure 64 may include any suitable mechanism capable of securing the tower 50 to the frame 22. For example, the attachment structure 64 may include a bolt 44, which passes through a flange 66 on the tower 50, disposed adjacent the top of the tower 50, and which is threaded or otherwise secured to the frame 22. By recessing a portion of the engine mount 58 into the central cavity 62 of the tower 50, the point of attachment between the mounting bracket 60 and the engine mount 58 is positioned nearer the top of the tower 50 and the attachment structure 64, which secures the tower 50 relative to the frame 22. In so doing, the rigidity of the engine mounting system 56 is increased.

Referring to FIG. 2, the engine mounting system 56 positions the powertrain to provide a lateral offset distance 72, measured between the torque axis 42 and an elastic center 68 of the engine mounting system 56, and a vertical offset distance 74, measured between the torque axis 42 and the elastic center 68 of the engine mounting system 56. It should be appreciated that each of the first engine mounting system 56A and the second engine mounting system 56B define an elastic center 68. The elastic center 68 is defined herein as a geometric point of the engine mounting system 56, wherein an applied unit load results in pure translation/rotation in the direction of loading (force/torque). The lateral offset distance 72 is preferably between the range of 270 mm and 340 mm, depending upon the architectural limits of the vehicle 20. Preferably, the vehicle 20 is configured to include the largest value for the lateral offset distance 72 that the architecture of the vehicle 20 allows. The vehicle 20 is configured to provide the smallest value possible for the vertical offset distance 74 that the architecture of the vehicle 20 allows. Accordingly, the vertical offset distance 74 is minimized.

The engine mounting system 56 further includes a mounting fastener 78, which interconnects the engine mount 58 and the mounting bracket 60. Due to the relatively high position of the engine mount 58, and depending upon the configuration of the engine 34, tools may not be able to engage the mounting fastener 78 in a vertical manner from above. Accordingly, in able to allow installation of the mounting bracket 60 to the engine mount 58, the mounting fastener 78 may extend laterally, relative to the longitudinal axis 24, into and out of engagement with the engine mount 58 and the mounting bracket 60. For example, the engine mount 58 may include an extension 80, which extends vertically upward from the tower 50. The extension 80 may define a laterally extending threaded bore 82. The mounting bracket 60 may be formed to include a pocket 84 that nests over the extension 80. The pocket 84 may define an aperture 86 that is aligned with the threaded bore 82 of the extension 80. The mounting fastener 78 extends laterally through the aperture 86 of the pocket 84, relative to the longitudinal axis 24, and into threaded engagement with the threaded bore 82 of the extension 80, to connect the mounting bracket 60 to the engine mount 58.

Figure 4:
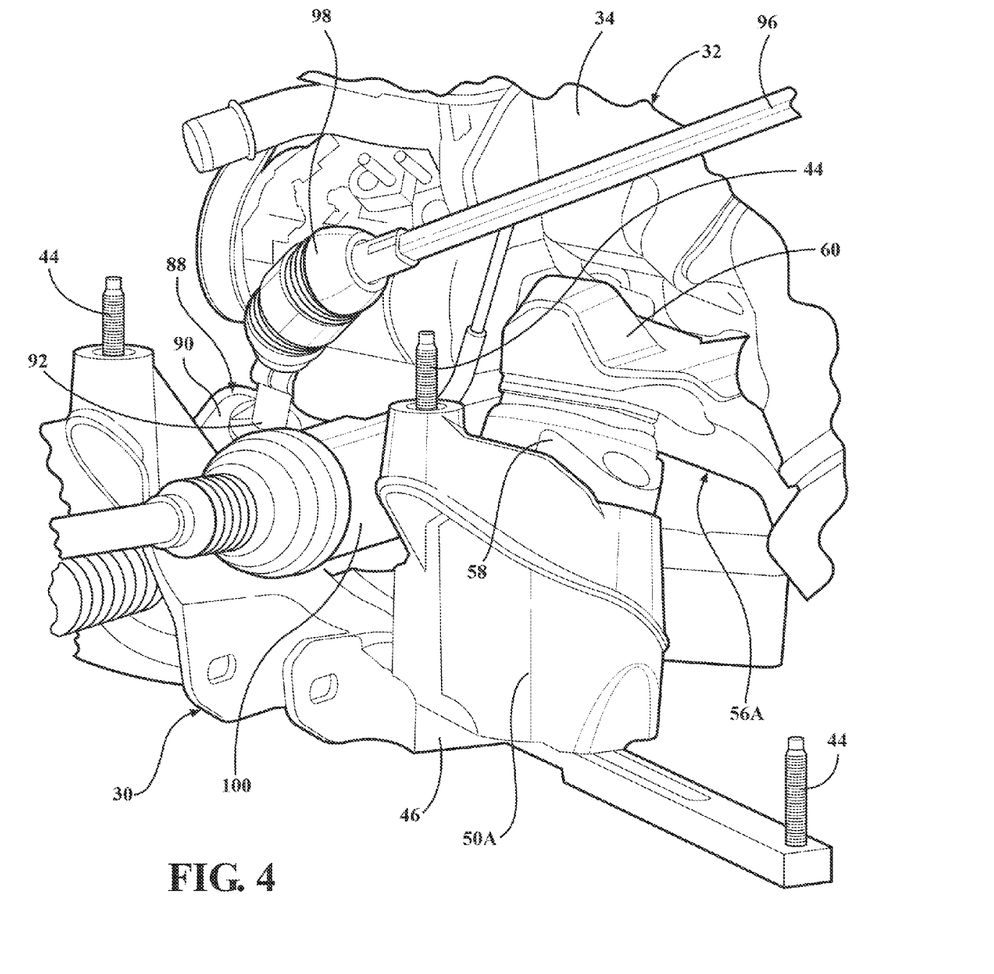
FIG. 4 is a schematic perspective view of the vehicle, as viewed from a left, rear side of the vehicle.
Figure 5:
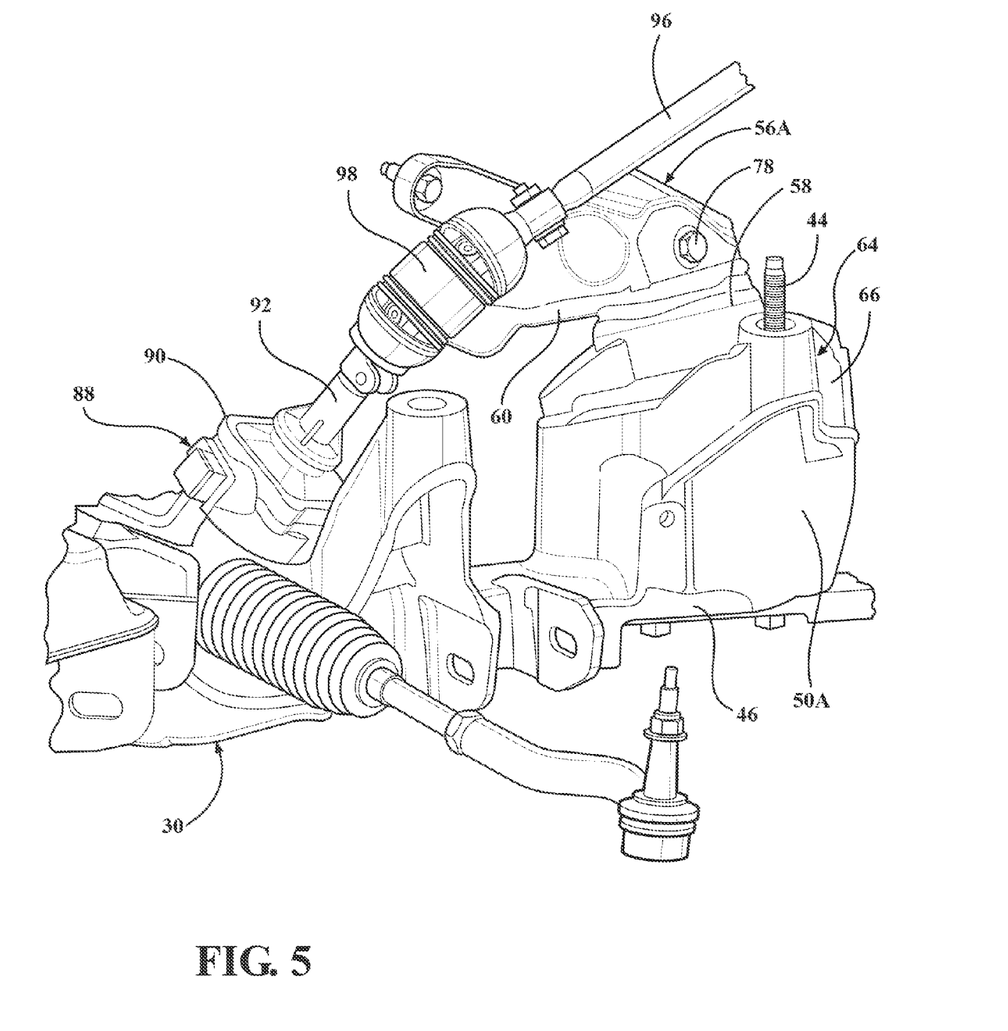
FIG. 5 is a schematic perspective view of the vehicle, as viewed from a left, front side of the vehicle.

Referring to FIGS. 1, 3, and 4, the vehicle 20 further includes a steering system 88, which is at least partially attached to and supported by the cradle 30. The steering system 88 may include, but is not limited to, a steering gear 90 having a pinion shaft 92 extending therefrom. The pinion shaft 92 extends from the steering gear 90 to form a pinion angle 94 relative to the horizontal plane 48. An intermediate shaft 96 is coupled to the pinion shaft 92, and transmits rotation from a steering wheel (not shown) to the pinion shaft 92. Because of the relatively high and laterally outboard position of the engine mount 58, which is required to align the elastic axis 40 with the torque axis 42, the intermediate shaft 96 of the steering system 88 may not be connected to the pinion shaft 92 in a conventional manner, such as with a single cardan joint or rubber coupler. Accordingly, the pinion angle 94 is increased, relative to the horizontal plane 48, and a double-cardan joint 98 is used to connect the pinion shaft 92 and the intermediate shaft 96. Typically, the angle between the pinion shaft 92 and the intermediate shaft 96 is less than 30°. However, the specific value of the pinion angle 94 will depend upon the specific design configuration of the vehicle 20. The increased pinion angle 94, and the use of the double-cardan joint 98 interconnecting the pinion shaft 92 and the intermediate shaft 96, positions the intermediate steering shaft vertically above the engine mounting system 56, thereby allowing the optimized position of the engine mount 58 system.

Figure 6:
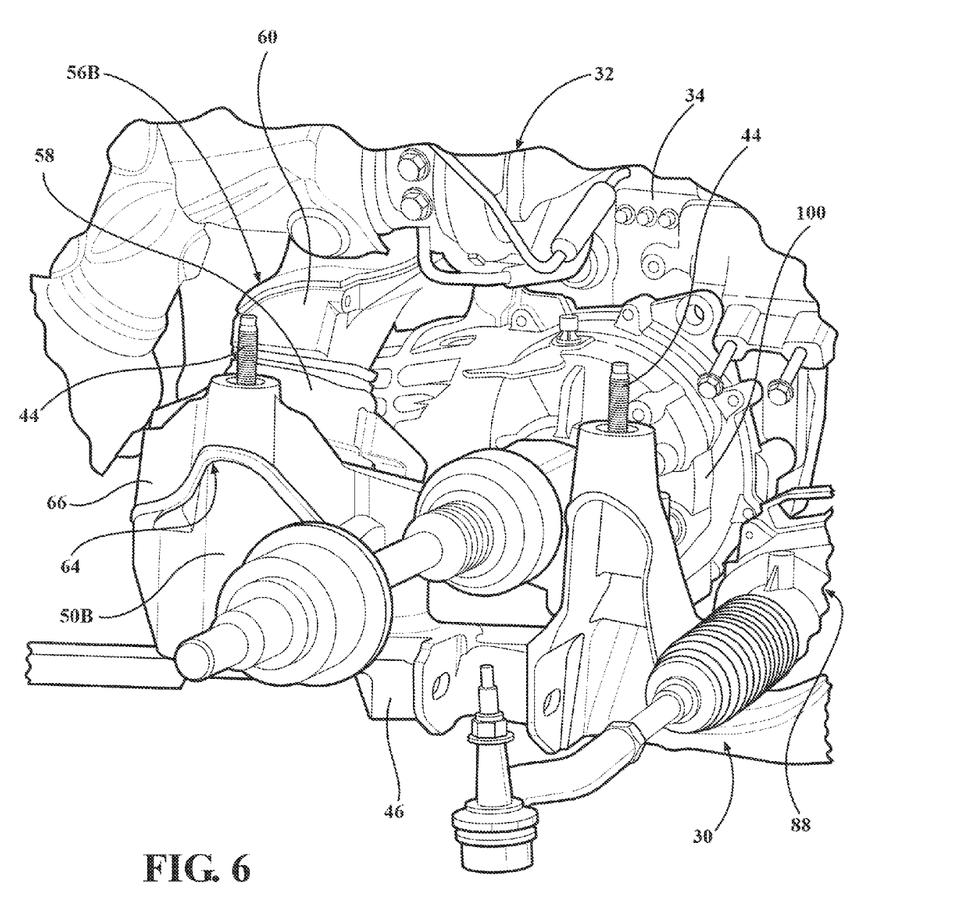
FIG. 6 is a schematic perspective view of the vehicle, as viewed from a right, front side of the vehicle.
Figure 7:
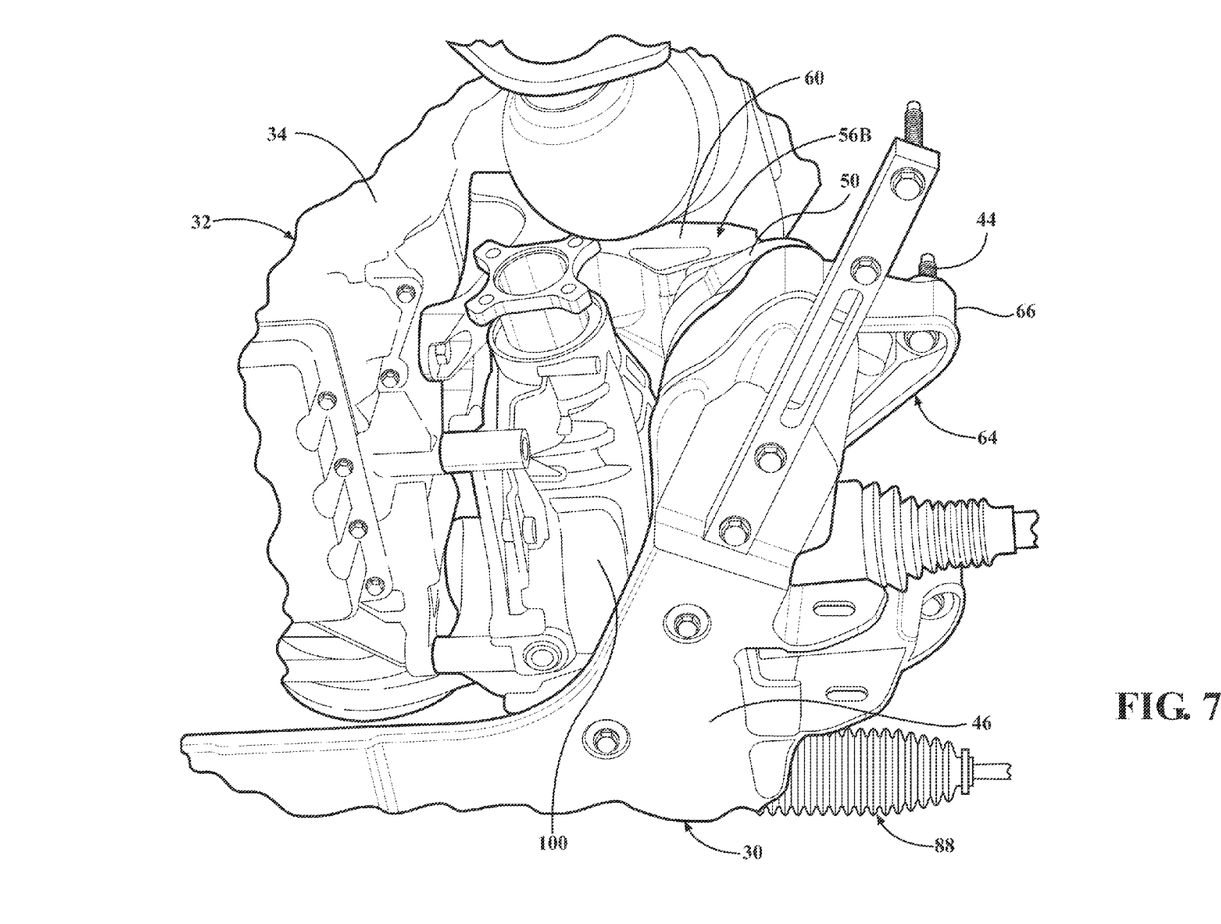
FIG. 7 is a schematic perspective view of the vehicle, as viewed from below on the right side of the vehicle.

Referring to FIGS. 6 and 7, if the vehicle 20 is configured as an all-wheel drive vehicle 20, then the vehicle 20 will further include a front differential 100. The front differential 100 is preferably directly attached to the engine 34 of the powertrain 32. Because of the relatively high and laterally outboard position of the engine mount 58, which is required to align the elastic axis 40 with the torque axis 42, the front differential 100 may be positioned such that the front differential 100 is at least partially disposed between the tower 50 of the cradle 30 and the powertrain 32, and is at least partially disposed vertically beneath the engine mounting system 56. As such, the front differential 100 may extend along or approximately parallel with the longitudinal axis 24, between the tower 50 and the engine 34, and be disposed beneath the mounting bracket 60, and above the lower cradle structure 46 of the cradle 30. Accordingly, the front differential 100 may be bounded vertically above by the engine mounting system 56, and particularly by the mounting bracket 60, bounded vertically below by the lower cradle structure 46 of the cradle 30, bounded laterally inboard by the powertrain 32, and bounded laterally outboard by the tower 50 of the cradle 30.

The detailed description and the drawings or figures are supportive and descriptive of the disclosure, but the scope of the disclosure is defined solely by the claims. While some of the best modes and other embodiments for carrying out the claimed teachings have been described in detail, various alternative designs and embodiments exist for practicing the disclosure defined in the appended claims.

The invention claimed is:

1. A vehicle comprising:
   a frame extending along a longitudinal axis between a forward end and a rearward end;
   a cradle attached to the frame proximal to the forward end of the frame;
   a powertrain having a crank axis, the powertrain being supported by the cradle such that the crank axis extends along the longitudinal axis;
   wherein the powertrain includes an elastic axis extending through the powertrain around which the powertrain oscillates without any translation due to a unit torque applied on the elastic axis, and wherein the powertrain includes a torque axis about which the powertrain oscillates in response to a crankshaft torque;
   an engine mounting system interconnecting the powertrain and the cradle,
   wherein the engine mounting system supports the powertrain relative to the frame such that the elastic axis of the powertrain is substantially aligned with the torque axis of the powertrain;
   wherein an angle between the elastic axis and a horizontal plane is within 5° of an angle between the torque axis and the horizontal plane; and
   wherein the horizontal plane substantially is parallel with the frame.

2. A vehicle as set forth in claim 1 wherein a center of gravity of the powertrain is vertically offset from the elastic axis a distance equal to or less than 50 mm.

3. A vehicle as set forth in claim 1 wherein the cradle includes a lower cradle structure substantially aligned along a horizontal plane, and a tower extending vertically upward from the structure, with the engine mounting system attached to the tower of the lower cradle structure, wherein the horizontal plane is substantially parallel with the frame.

4. A vehicle as set forth in claim 3 wherein the tower defines a central cavity.

5. A vehicle as set forth in claim 4 wherein the engine mounting system includes an engine mount that is at least partially disposed within the central cavity of the tower.

6. A vehicle as set forth in claim 3 wherein the tower includes an attachment structure, interconnecting the tower and the frame to support the tower relative to the lower cradle structure.

7. A vehicle as set forth in claim 3 wherein the engine mounting system includes an engine mount attached to the tower, and a mounting bracket attached to the powertrain and the engine mount.

8. A vehicle as set forth in claim 7 wherein the engine mounting system further includes a fastener interconnecting the engine mount and the mounting bracket, wherein the fastener extends laterally, relative to the longitudinal axis, into and out of engagement with the engine mount and the mounting bracket.

9. A vehicle as set forth in claim 8 wherein the engine mount includes an extension extending vertically upward, and defining a laterally extending threaded bore, and the mounting bracket includes a pocket that nests over the extension and defines an aperture, with the fastener extending laterally through the aperture of the pocket, relative to the longitudinal axis, and into threaded engagement with the threaded bore of the extension to connect the mounting bracket to the engine mount.

10. A vehicle as set forth in claim 3 further comprising a steering system attached to and supported by the cradle, and including a pinion shaft forming a pinion angle relative to the horizontal plane.

11. A vehicle as set forth in claim 10 wherein the steering system further includes a double-cardan joint connecting an intermediate steering shaft to the pinion shaft.

12. A vehicle as set forth in claim 11 wherein the intermediate steering shaft is disposed vertically above the engine mounting system.

13. A vehicle as set forth in claim 3 further comprising a front differential attached to the powertrain, wherein the front differential is at least partially disposed between the tower of the cradle and the powertrain, and is at least partially disposed vertically beneath the engine mounting system.

14. A vehicle as set forth in claim 1 further comprising a start/stop system operable to automatically stop and start an engine of the powertrain.

15. A vehicle as set forth in claim 14 wherein the start/stop system includes a starter operable to start the engine, and a controller operable to stop the start the engine and the starter.

16. A vehicle configured for rear wheel drive, the vehicle comprising:
   a frame extending along a longitudinal axis between a forward end and a rearward end;
   a cradle attached to the frame proximal to the forward end of the frame, wherein the cradle includes a structure substantially aligned along a horizontal plane, and a tower extending vertically upward from the structure, wherein the horizontal plane is substantially parallel with the frame;
   a powertrain supported by the cradle, and including a crank axis extending along the longitudinal axis of the frame, an elastic axis, and a torque axis;
   wherein the elastic axis is an axis that extends through the powertrain, and around which the powertrain oscillates without any translation due to a unit torque applied to the elastic axis;
   wherein the torque axis is an axis that extends through the powertrain, and around which the powertrain oscillates in response to a crankshaft torque; and
   an engine mounting system interconnecting the powertrain and the cradle, wherein the engine mounting system includes an engine mount attached to the tower, and a mounting bracket attached to the powertrain and the engine mount;
   wherein the tower is laterally offset from the longitudinal axis, and elevates the engine mount relative to a center of gravity of the powertrain to position the engine mounting system such that an angle between the elastic axis and the horizontal plane is within 5° of an angle between the torque axis and the horizontal plane, and the center of gravity of the powertrain is vertically offset from the elastic axis a distance equal to or less than 50 mm.

17. A vehicle as set forth in claim 16 wherein the tower includes an attachment structure, interconnecting the cradle and the frame, and disposed adjacent the tower to support the tower relative to the lower cradle structure of the cradle.

18. A vehicle as set forth in claim 17 wherein the engine mounting system further includes a fastener interconnecting the engine mount and the mounting bracket, wherein the fastener extends laterally relative to the longitudinal axis, and substantially parallel with the horizontal plane, into and out of engagement with the engine mount and the mounting bracket.

19. A vehicle as set forth in claim 16 further comprising a front differential attached to the powertrain, wherein the front differential is at least partially disposed between the tower of the cradle and the powertrain, and is at least partially disposed vertically beneath the engine mounting system.

* * * * *